（12） United States Patent
You

(10) Patent No.: US 10,438,295 B2
(45) Date of Patent: *Oct. 8, 2019

(54) METHOD AND SYSTEM FOR E-COMMERCE TRANSACTION DATA ACCOUNTING

(71) Applicant: Alibaba Group Holding Limited, Grand Cayman (KY)

(72) Inventor: Zhantao You, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 256 days.

This patent is subject to a terminal disclaimer.

(21) Appl. No.: 14/704,160

(22) Filed: May 5, 2015

(65) Prior Publication Data

US 2015/0235327 A1    Aug. 20, 2015

Related U.S. Application Data

(63) Continuation of application No. 13/148,280, filed as application No. PCT/US2011/020050 on Jan. 3, 2011, now Pat. No. 9,058,631.

(30) Foreign Application Priority Data

Feb. 11, 2010    (CN) .......................... 2010 1 0111741

(51) Int. Cl.
G06Q 30/06    (2012.01)
G06Q 40/00    (2012.01)
(Continued)

(52) U.S. Cl.
CPC ............. *G06Q 40/12* (2013.12); *G06F 16/23* (2019.01); *G06F 16/2365* (2019.01);
(Continued)

(58) Field of Classification Search
None
See application file for complete search history.

(56) References Cited

U.S. PATENT DOCUMENTS 5,812,793 A * 9/1998 Shakib .................... H04L 29/06
                                                       707/999.008
6,039,245 A    3/2000 Symonds et al.
(Continued)

FOREIGN PATENT DOCUMENTS

JP    2002288070 A    10/2002
JP    2009505233 A    2/2009
(Continued)

OTHER PUBLICATIONS

NPL_What is Asynchronous Messaging—Definition from Techopedia, downloaded Jun. 26, 2018 from https://www.techopedia.com/definition/26454/asynchronous-messaging, 3 pages. (Year: 2018).*
(Continued)

*Primary Examiner* — Paul Danneman
(74) *Attorney, Agent, or Firm* — Lee & Hayes, P.C.

(57) ABSTRACT

Method and system for e-commerce transaction data accounting are disclosed. A method comprises: a second server receiving transaction data from a first server; the second server analyzing the received transaction data to identify a classification of the received transaction data; the second server obtaining historical transaction data from a second database based on the classification of the received transaction data, wherein the second database obtains transaction data that meet a preset condition from a data warehouse system and compares the transaction data that meet the preset condition with previously obtained transaction data to update inconsistency in the transaction data that meet the preset condition; and the second server combining the
(Continued)

received transaction data and the historical transaction data to produce current transaction data.

13 Claims, 4 Drawing Sheets

(51) Int. Cl.
  *G06F 16/23* (2019.01)
  *G06F 16/28* (2019.01)
(52) U.S. Cl.
  CPC .......... *G06F 16/283* (2019.01); *G06Q 30/06* (2013.01); *G06Q 40/10* (2013.01)

(56) References Cited

U.S. PATENT DOCUMENTS

| | | | |
|---|---|---|---|
| 6,169,974 | B1 | 1/2001 | Baumgartner et al. |
| 6,366,682 | B1 | 4/2002 | Hoffman et al. |
| 6,792,422 | B1* | 9/2004 | Stride .................. G06Q 40/00 705/35 |
| 7,513,418 | B2 | 4/2009 | Dragt et al. |
| 2001/0016833 | A1 | 8/2001 | Everling et al. |
| 2003/0088562 | A1 | 5/2003 | Dillon et al. |
| 2004/0034670 | A1* | 2/2004 | Bhuyan ................ G06F 16/273 |
| 2005/0177494 | A1 | 8/2005 | Kelly et al. |
| 2006/0136329 | A1 | 6/2006 | Ahles |
| 2006/0173742 | A1 | 8/2006 | Heene |
| 2006/0178918 | A1 | 8/2006 | Mikurak |
| 2007/0299775 | A1 | 12/2007 | Algiene |
| 2008/0033793 | A1 | 2/2008 | Roberts |
| 2008/0255940 | A1 | 10/2008 | Perreault et al. |
| 2008/0270398 | A1 | 10/2008 | Landau et al. |
| 2009/0182718 | A1 | 7/2009 | Waclawik et al. |
| 2010/0114774 | A1 | 5/2010 | Linaman et al. |

FOREIGN PATENT DOCUMENTS

| | | |
|---|---|---|
| WO | WO9924922 A1 | 5/1999 |
| WO | WO0004466 A1 | 1/2000 |

OTHER PUBLICATIONS

European Office Action dated Dec. 3, 2015 for European patent application No. 11742592.6, a counterpart foreign application of U.S. Pat. No. 9,058,631, 9 pages.
Chinese Office Action dated Apr. 23, 2012 for Chinese patent application No. 201010111741.9, a counterpart foreign application of U.S. Appl. No. 13/148,280, 5 pages.
Chinese Office Action dated May 15, 2013 for Chinese patent application No. 201010111741.9, a counterpart foreign application of U.S. Appl. No. 13/148,280, 5 pages.
Extended European Search Report dated Sep. 19, 2013 for European patent application No. 11742592.6, 9 pages.
Final Office Action for U.S. Appl. No. 13/148,280, dated Dec. 18, 2013, Zhantao You, "Method and System for E-Commerce Transaction Data Accounting," 17 pages.
Hurson et al., "Security Issues and Solutions in Distributed Heterogeneous Mobile Database Systems," Advances in Computers (Book), vol. 61, published 2004, retrieved from the internet on Feb. 10, 2011 at <<URL: http://cd.mst.edu/documents/hurson/cs-4xx/Security_issues_and_Solutions_in_Distributed_heterogeneous_Mobile_Database_Systems.pdf>>, 76 pages.
Translated Japanese Office Action dated Jan. 13, 2015 for Japanese patent application No. 2012-552879, a counterpart foreign application of U.S. Appl. No. 13/148,280, 6 pages.
Kakuda et al., "The distributed management method of users' session on the servers," Report of Study of Information Processing Society of Japan, vol. 2000, No. 30, Mar. 22, 2000, pp. 225-230.
Office Action for U.S. Appl. No. 13/148,280, dated Oct. 9, 2014, Zhantao You, "Method and System for E-Commerce Transaction Data Accounting," 20 pages.
Office action for U.S. Appl. No. 13/148,280, dated Jun. 20, 2014, You, "Method and System for E-Commerce Transaction Data Accounting," 20 pages.
Office action for U.S. Appl. No. 13/148,280, dated Sep. 25, 2013, You, "Method and System for E-Commerce Transaction Data Accounting," 14 pages.
PCT Search Report and Written Opinion dated Mar. 7, 2011 for PCT Application No. PCT/US11/20050, 7 pages.
Seguineau, "Antecipate: What is so advanced in AMQP?" retrieved on Jun. 12, 2014, at <<http://antecipate.blogspor.com/2006/07/what-is-so-advanced-in-amqp.html>> 2006, 4 pages.
Squire, "Data Extraction and Transformation for the Data Warehouse," SIGMOD '95, San Jose, CA, USA, 1995, 2 pages.
Weyman, "The Case for a Process-Driven Approach to Data Warehousing," Database and Network Journal, A.P. Publications, London, GB, vol. 27, No. 1, Feb. 1, 1997, pp. 3-6.
White, "Data Warehousing: Cleaning and Transforming Data," Info DB, Iowa City, US, vol. 10, No. 6, Apr. 1, 1997, pp. 11-12.
White, "Managing Data Transformations," Byte, McGraw-Hill Inc., St. Peterborough, US, vol. 22, No. 12, Dec. 1, 1997, pp. 53-54.
European Office Action dated Jul. 5, 2017 for European Patent Application No. 11742592.6, a counterpart foreign application of U.S. Pat. No. 9,058,631, 11 pages.
Chinese Office Action dated Jan. 31, 2013 for Chinese patent application No. 201010111741.9, a counterpart foreign application of U.S. Appl. No. 13/148,280, 9 pages.

* cited by examiner

METHOD AND SYSTEM FOR E-COMMERCE TRANSACTION DATA ACCOUNTING

CROSS REFERENCE TO RELATED PATENT APPLICATIONS

This application is a continuation of and claims priority to U.S. patent application Ser. No. 13/148,280, filed on Aug. 5, 2011, which is a national stage application of an international patent application PCT/US2011/020050, filed Jan. 3, 2011, which claims priority from Chinese Patent Application No. 201010111741.9, filed Feb. 11, 2010, entitled "Method and System for E-Commerce Transaction Data Accounting," which applications are hereby incorporated in their entirety by reference.

TECHNICAL FIELD

The present disclosure relates to the field of computer and, more particularly, to a method, server and system for accounting e-commerce transaction data.

BACKGROUND

With the Internet rapidly developing and e-commerce gradually becoming a necessity, all kinds of e-commerce websites have been rapidly emerging.

The inventors of the present disclosure observed the following in the research and practices of the existing technologies: when it comes to large e-commerce website, e-commerce transaction systems generally store transaction data in its database. Moreover, there are tens of millions of database operations daily. Due to the need for real-time data accounting (also known as data statistics) and updates, the operation of database must be continuous and non-stop. If such real-time data accounting takes place directly in the e-commerce transaction system database, a large burden would be placed on the server(s) of the e-commerce transaction system. This could affect normal transactions, and during extreme cases, it may even cause the database to crash and the entire website to become unavailable to users.

SUMMARY OF THE DISCLOSURE

The objective of the present embodiment is to provide a method, server, and e-commerce system for accounting transaction data. With real-time accounting of e-commerce transaction data, the system will not be burdened further and normal transactions will not be interrupted.

In one aspect, a method of data accounting of e-commerce transaction data may comprise: a second server of an e-commerce transaction data accounting system receiving transaction data from a first server of an e-commerce transaction system that comprises the first server and a first database; the second server analyzing the received transaction data to identify a classification of the received transaction data; the second server obtaining historical transaction data from a second database of the e-commerce transaction data accounting system based on the classification of the received transaction data, wherein the second database obtains transaction data that meet a preset condition from a data warehouse system and compares the transaction data that meet the preset condition with previously obtained transaction data to update inconsistency in the transaction data that meet the preset condition; and the second server combining the received transaction data and the historical transaction data to produce current transaction data.

Preferably, a second server of an e-commerce transaction data accounting system receiving transaction data from a first server of an e-commerce transaction system comprises: the second server receiving one or more asynchronous messages from the first server, the one or more asynchronous messages containing the transaction data.

Preferably, for every passage of a predetermined time interval, the second database obtains transaction data that meet the preset condition from the data warehouse system, the transaction data that meet the preset condition comprising transaction data that varied during a most recent time interval.

Preferably, the classification of the received transaction data is based on users or types of transaction operations.

Preferably, the method further comprises: after receiving the transaction data, the second server storing the received transaction data in the second database.

Preferably, the method further comprises: after receiving the transaction data, the second server storing a log of the received transaction data in a transaction data log table in the second database.

Preferably, the transaction data log table records data with user-initiated events as units for recording or with asynchronous messages sent from the first server to the second server as units for recording.

In another aspect, a second server of an e-commerce transaction data accounting system may comprise: a transaction data processing unit; and a transaction data accounting unit, The transaction data processing unit may receive transaction data from a first server of an e-commerce transaction system that comprises the first server and a first database, and transmit the received transaction data to the transaction data accounting unit. The transaction data accounting unit may analyze the received transaction data to identify a classification of the received transaction data, obtain historical transaction data from a second database of the e-commerce transaction accounting system based on the classification of the received transaction data, and combine the received transaction data and the historical transaction data to produce current transaction data.

Preferably, either the transaction data processing unit or the transaction data accounting unit stores the received transaction data in the second database after receiving the transaction data.

Preferably, after receiving the transaction data, the transaction data processing unit stores a log of the received transaction data in a transaction data log table in the second database.

Preferably, the transaction data log table records data with user-initiated events as units for recording or with asynchronous messages sent from the first server to the second server as units for recording.

Preferably, the transaction data processing unit receives one or more asynchronous messages from the first server, the one or more asynchronous messages containing the transaction data.

Preferably, the classification of the received transaction data is based on users or types of transaction operations.

Preferably, after receiving the transaction data from the first server, the transaction data processing unit stores the received transaction data in the second database, analyzes the received transaction data to identify a classification of the received transaction data, and transmits a trigger message to the transaction data accounting unit, the trigger message indicative of the classification of the received transaction data and triggering the transaction data accounting unit to perform accounting of the obtained transaction data.

In yet another aspect, an e-commerce transaction data accounting system in an e-commerce system that also comprises an e-commerce transaction system and a data warehouse system is provided. The e-commerce transaction data accounting system may comprise: a second server; and a second database. The second server may receive transaction data from a first server of the e-commerce transaction system that comprises the first server and a first database. The second server may analyze the received transaction data to identify a classification of the received transaction data and obtain, from the second database, historical transaction data under the classification. The second server may combine the received transaction data and the historical transaction data to produce current transaction data. The second database may obtain transaction data that meet a preset condition from the data warehouse system of the e-commerce system, compare the transaction data with previously obtained transaction data, and update inconsistency in the transaction data.

Preferably, the second server receives one or more asynchronous messages from the first server, the one or more asynchronous messages containing the transaction data.

Preferably, after receiving the transaction data, the second server stores a log of the received transaction data in a transaction data log table in the second database.

Preferably, the transaction data log table records data with user-initiated events as units for recording or with asynchronous messages sent from the first server to the second server as units for recording.

Preferably, for every passage of a predetermined time interval, the second database obtains transaction data that meet the preset condition from the data warehouse system, the transaction data that meet the preset condition comprising transaction data that varied during a most recent time interval.

Preferably, the classification of the received transaction data is based on users or types of transaction operations.

It can be seen that the e-commerce transaction data accounting system can acquire data in real-time from the e-commerce transaction system server and not from the e-commerce transaction system database. In this manner, it will not add burden onto the database. It will also not affect normal business transactions. Moreover, it will not cause the system to crash making the website unavailable.

BRIEF DESCRIPTION OF DRAWINGS

To clearly illustrate the exemplary implementation of the disclosure or the existing technological plan, listed below are brief descriptions of the diagrams. Obviously, the diagrams listed below are just some of the embodiments of the exemplary implementation. A person of ordinary skill in the art may be able to derive other diagrams from the ones listed below.

DETAILED DESCRIPTION

The present embodiment provides a method, server, and system for accounting e-commerce transaction data.

Prior to discussing the disclosed method, server, and system, the network environment and some related expertise of the present embodiment need to be introduced first.

Figure 1:
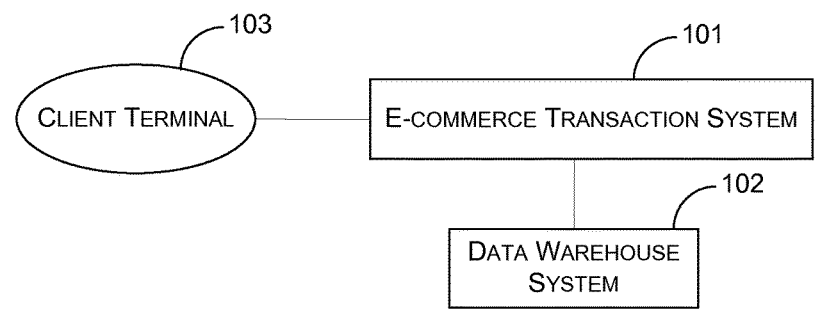
FIG. 1 shows a network environment graph according to an embodiment of the present disclosure.

The network environment of the present disclosure is illustrated in FIG. 1. Client 103 can log in to the e-commerce transaction system 101 to establish transactions, make payments and the like. The e-commerce transaction system 101 can record data and log in the data warehouse system 102.

The e-commerce transaction system 101 can have functions such as: displaying commodity, rendering transactions, managing transactions, and making payments.

The e-commerce transaction system 101 may comprise an application server and database. The application server can store transaction data in the database. With existing technology, transaction data are obtained from the database for accounting of transaction data.

Data warehouse system 102 is a subject-oriented, integrated, immutable, fixed data collection recording medium, used to support a business or organization's decision-making analysis. Specifically, the data warehouse system 102 will record detailed history of changes in the transaction data. Any operation by client 101 in the e-commerce transaction system 101 will be recorded in the data warehouse system 102.

Transaction data herein can refer to user account number, type of operation, transaction amount and the like. Types of operation may include, for example, transaction, payment, etc.

Figure 2:
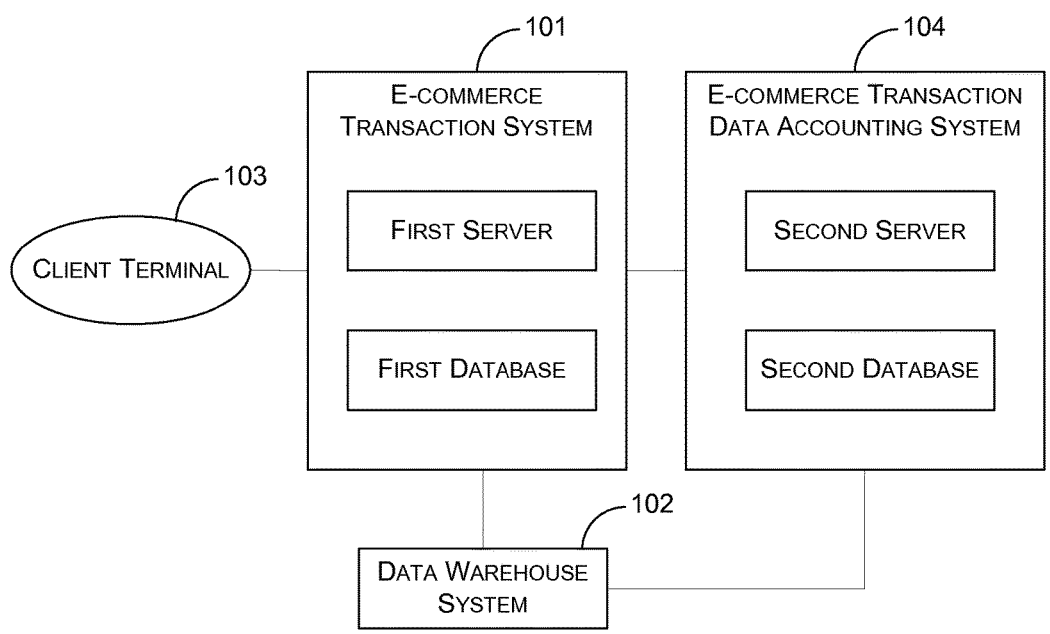
FIG. 2 shows a network environment graph of the e-commerce transaction data accounting system according to an embodiment of the present disclosure.

It is worth noting that the present disclosure adds a transaction data accounting system in addition to FIG. 1. As shown in FIG. 2, the transaction data accounting system 104 can interact with both e-commerce transaction system 101 and data warehouse system 102. The current embodiment refers to a network system having the e-commerce transaction system 101, data warehouse system 102 and transaction data accounting system 104 as an e-commerce system. In the e-commerce system, the e-commerce transaction system 101, data warehouse system 102 and e-commerce transaction data accounting system 104 are communicatively linked to one another. Of course, the e-commerce system may also comprise other network subsystems and network entities. Such other entities may include, for example, one or more client terminals for users to establish transactions in the e-commerce transaction systems as well as one or more client terminals used by system administrator in managing the transaction data accounting system. As mentioned earlier, the e-commerce transaction system 101 can comprise an application server and a database. For convenience, the application server and the database of the e-commerce transaction system 101 will be referred to as the first server and first database, respectively, for the remainder of the present disclosure. The transaction data accounting system 104 is used to perform data accounting of the transaction data from the e-commerce transaction system 101. The transaction data accounting system 104 also comprises an application server and a database which will be referred to as the second server and the second database, respectively, for the remainder of the present disclosure. All technical solutions of the present disclosure are applicable to the above e-commerce system.

In order for a person familiar with the technology to better appreciate the present disclosure's technological scheme, objective, features and benefits, a more detailed explanation with references to the figures is provided below.

Figure 3:
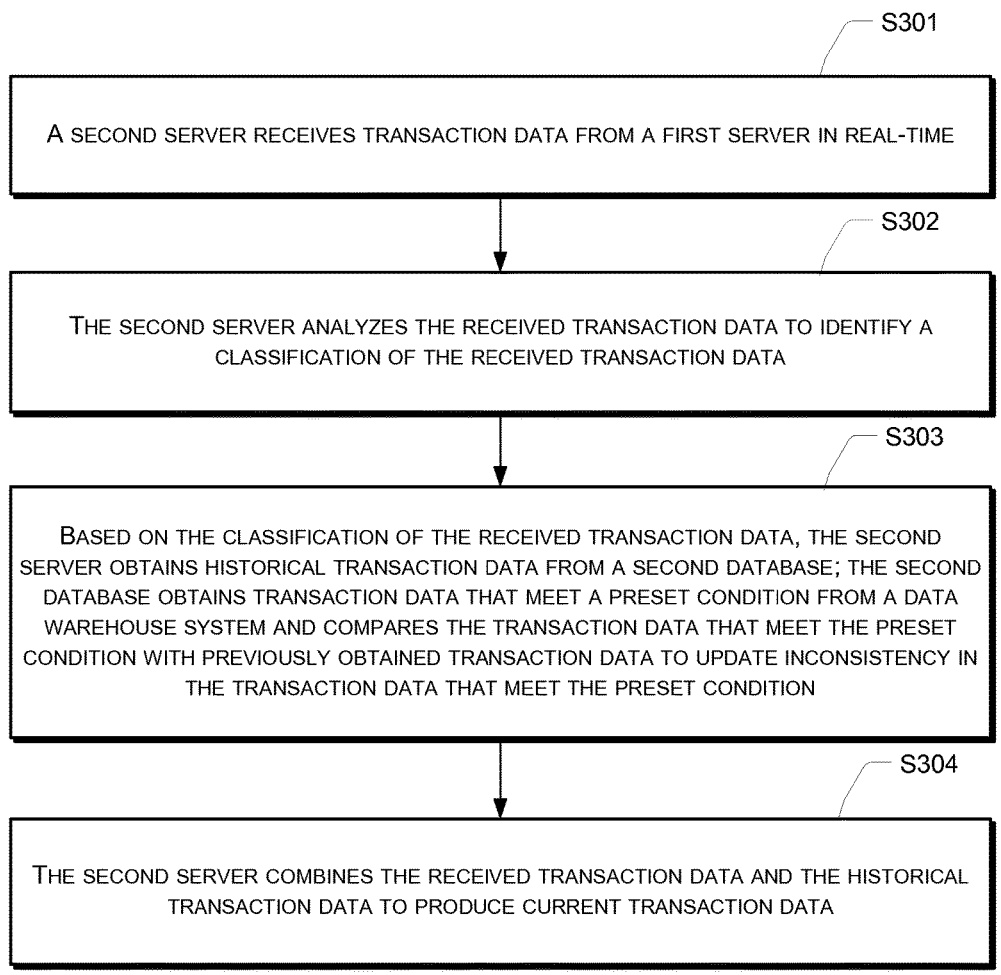
FIG. 3 shows a flowchart of a method for accounting e-commerce transaction data according to an embodiment of the present disclosure.

A method for accounting, or obtaining data statistics of, e-commerce transaction data will be first introduced. As mentioned earlier, this method is applicable to an e-commerce system comprising the e-commerce transaction system 101, data warehouse system 102, and transaction data accounting system 104. The e-commerce transaction system 101 comprises the first server and the first database. The transaction data accounting system 104 is used to perform data accounting of the transaction data generated from the e-commerce transaction system 101. The transaction data accounting system 104 comprises the second server and second database. With reference to FIG. 3, operation of this method is described below.

At S301, the second server obtains real-time transaction data from the first server.

Specifically, the first server can provide, in real-time, transaction data to the transaction data accounting system 104 independent of the e-commerce transaction system 101 and data warehouse system 102. In particular, the first server can provide the second server with transaction data on a real-time basis.

The first server can send to the second server one or more asynchronous messages containing the transaction data. For example, one or more asynchronous messages can contain data generated by one user from one operation. The one or more asynchronous messages can be either reliable or not. If the first server sends a reliable asynchronous message, the message will reach the second server without loss. If the asynchronous message is not reliable, there may be loss in information being transmitted. In other words, the second server may not receive the unreliable asynchronous message, thus the second server may not acquire the transaction data when it should.

In one embodiment, the operational cost associated with the use of reliable asynchronous messages will likely be higher than the operational cost associated with the use of unreliable asynchronous messages.

Moreover, the act of sending an asynchronous message is negligible to the first server. In other words, the sending of an asynchronous message will not likely influence regular business transactions provided by the e-commerce transaction system.

At S302, after obtaining transaction data, the second server analyzes the transaction data and acquires information related to the classification of the transaction data (which may be referred to as "classification information" hereinafter).

In one embodiment, the transaction data can be divided into multiple classifications. For instance, the classification of transaction data may be based on the users or the types of transaction operations. An example would be that some transaction data may be generated by one user establishing transaction in the e-commerce transaction system 101 through a client terminal. This type of transaction data is classified as transaction data of the user. Another example would be that some transaction data may be generated by the operation of one user in the e-commerce transaction system 101 through a client terminal. Such operation, for example, may be making payment (meaning successful transaction) to a seller. Consequently, this type of transaction data is classified as business operations. Of course, there may be many other classifications of transaction data which, in the interest of brevity, will not be explained further.

After obtaining the transaction data, the second server analyzes the data and determines the classification of the transaction data. In one embodiment, the message sent by the first server not only contains the content of the transaction data but also its classification. Under these circumstances, the second server can directly determine the classification of the transaction data from the message. In another embodiment, the second server can have stored therein a number of keywords and a correlation table reflecting the correlation between classifications and the keywords. One classification can correlate to one or multiple keywords. Upon obtaining transaction data, the second server can extract a keyword from the transaction data, and look up the corresponding classification from the correlation table. Of course, there may be other means of accounting the transaction data and determining the classification of the transaction data which, in the interest of brevity, will not be explained.

At S303, based on the classification of the transaction data, the second server obtains, from the second database, historical transaction data. The second database stores the transaction data and searches the data warehouse system 102 to acquire the transaction data that meet a preset condition. This data and the one obtained earlier are compared, and any inconsistency in the transaction data is updated.

After obtaining the classification of the transaction data, the second server sends a request message to the second database. The request message contains the classification of the transaction data, and requests for the historical data under the classification. Upon receiving the request message, the second database can use the classification of the transaction data contained in the request as a keyword to locally search for historical transaction data of such classification and to provide the historical transaction data to the second server. Under special circumstances, such as when the second database might not yet have any transaction data of a given classification stored therein, the second database may, for example, respond to the request by sending the second server a response message that indicates that the second database found no historical transaction data under that classification.

As was mentioned earlier, if the asynchronous message sent by the first server is unreliable, then the second server might not be able to receive it, leading to the failure of obtaining some transaction data by the second server. In this regard, the second database can inquire the data warehouse system 102 to obtain transaction data conforming to certain preset condition. The second server can then compare the obtained data and data previously gathered, and update inconsistency in the transaction data.

In one embodiment, for every passage of a predetermined time interval, the second database can inquire the data warehouse system 102 to obtain transaction data that meet a preset condition. The predetermined time interval can be set by system administrator or suitable personnel according to actual needs, such as 10 minutes for example. The preset condition can also be set according to actual needs. For instance, data having changed within the most recent time interval (e.g., the past week) may be considered to meet the preset condition where newly added data may be a type of such data.

The second database can compare the obtained transaction data that meet the preset condition with previously obtained transaction data meeting the preset condition (which may be referred to "previous corresponding transaction data" hereinafter), and update inconsistency in the transaction data.

At S304, the second server integrates the transaction data and the historical data of the same classification to obtain the current transaction data.

In one embodiment, the second server analyzes the transaction data in real time based on analysis rules. Before accounting the data, the second server can obtain a client's preferred analysis rule for accounting the transaction data. For example, the system administrator of the e-commerce system can provide analysis rules to the second server through a client terminal.

In one embodiment, the analysis rule may require adding, or combining, transaction data of the same classification. Under such rule, the second server can combine the obtained transaction data to historical transaction data of the same classification.

The following is an example of classifying the transaction data based on users. In this case, the second database can store user-specific transaction data for each user. Alternatively, each piece of user information corresponds to a transaction record and vice versa. Therefore, within the transaction record there is one transaction data related to the user. In one embodiment, after obtaining transaction data and historical transaction data of a user, the second server combines these data to obtain the current transaction data. Subsequently, the current transaction data can be stored in the transaction record of the user in the second database.

For instance, suppose the transaction record of user 1 contains the user's account number, number of transactions completed and overall monetary amount of transaction. When user 1 completes a transaction through a client terminal, the first server generates corresponding transaction data comprising the monetary amount of the transaction. Upon obtaining such transaction data and determining that the user corresponding to the transaction data is user 1, the second server requests the second database for the historical transaction data of user 1. The second database then searches locally for the corresponding transaction record of user 1 and sends back the requested historical data to the second server. Subsequently, the second server adds the transaction amount, contained in the historical transaction data obtained from the second database, to the transaction amount contained in the corresponding transaction record of user 1 which includes the superposed transaction amount (namely, combining the obtained transaction data of user 1 with the historical transaction data of user 1) to result in a new overall transaction amount (namely, the current overall transaction data of user 1). The second server can send the current overall transaction amount to a client terminal of a system administrator. Alternatively, the second server may generate graphs depicting the transaction amount of user 1, and the system administrator can observe the graphs to discern trends of variation in the overall transaction amount of user 1.

The following is an example of classifying the transaction data based on transaction operation. In this case, every transaction data corresponds to at least one transaction data classification. Transaction data classification may be overall monetary amount of transaction within a period of time, number of total established transactions within a period of time, or number of total successful transactions within a period of time. In one embodiment, after obtaining one type of transaction data and the corresponding historical transaction data of a type of transaction operation, the second server can add the data together to obtain updated current transaction data of this type of transaction operation.

For instance, suppose the second server needs to compute the overall monetary amount of transaction within a period of time (with the type of transaction operation being payment and/or receipt of payment funds, and without differentiation by user). When user 1 completes a transaction in the e-commerce transaction system 101 through a client terminal, the second server will generate corresponding transaction data comprising the monetary amount of the transaction. Upon determining the transaction amount corresponds to the transaction operation of payment or receipt of payment funds, the second server requests the second database for the historical transaction amount the transaction operation of which being payment or receipt of payment funds. The second database then searches locally for the corresponding historical transaction amount to send back to the second server. Subsequently, the second server adds the obtained transaction amount to the historical transaction amount corresponding to payment or receipt of payment funds to result in the new overall transaction amount. The second server can send the new overall transaction amount to a client terminal of a system administrator. Alternatively, the second server may generate graphs depicting the transaction amount of user 1, and the system administrator can observe the graphs to discern trends of variation in the overall transaction amount of user 1.

As previously mentioned, the transaction data obtained by the second database from the data warehouse system 102 that conform to the preset condition may be inconsistent with the previously obtained transaction data. If that is the case, the second database can use the data from the data warehouse system 102 as the data to be used for analysis. In other words, data sent by the second database to the second server should be complete and accurate. Therefore, computation and analysis performed by the second server will be based on complete and accurate data.

For instance, suppose within 10 minutes user 1 via a client terminal completes a transaction in the e-commerce transaction system 101. The first server sends out an asynchronous message which carries transaction data generated by the first server that comprises the transaction amount. However, for whatever reason, the second server does not receive this asynchronous message. At the end of the 10-minute period, the second database sends a request to the data warehouse system 102 for data that have changed within the 10 minutes. In response, the data warehouse system 102 provides to the second database data that have changed within the 10 minutes, including the aforementioned transaction amount. The second database compares the changes in the data that have changed within the 10 minutes as provided by the data warehouse system 102 with locally stored data to determine that the second database did not receive the transaction data of the transaction by user 1 that took place during the 10-minute period. Accordingly, the second database stores the transaction data of the transaction by user 1 during the 10-minute period in a transaction record corresponding to user 1. Afterwards, the second server can amend the illustrated graphics corresponding to the transaction amount of user 1 and display the graphics to the client terminal of a system administrator.

Optionally, after operation S301, the second server can record a log of the transaction data in a transaction data log table of the second database. The transaction data log can be constructed such that a record is based on an event initiated by a user or based on an asynchronous message.

In addition, every time the second server obtains transaction data, it can store the obtained transaction data in the second database. The second database can also analyze the transaction data to obtain the classification of the transaction data. In this way, in future search of transaction data that fall under certain classification, the second database can search all transaction data correlated to this classification.

Moreover, in one embodiment, the system administrator of the e-commerce system may need to inquire about transaction data. Under these circumstances, the client terminal used by the system administrator can send a request message to the second server for transaction data conforming to certain preset condition. Upon receiving the request message, the second server can request the second database for transaction data meeting such preset condition. The second database searches for the transaction data conforming to the preset condition and sends it back to the second server. The second server then provides the transaction data to the client terminals of the system administrator.

Figure 4:
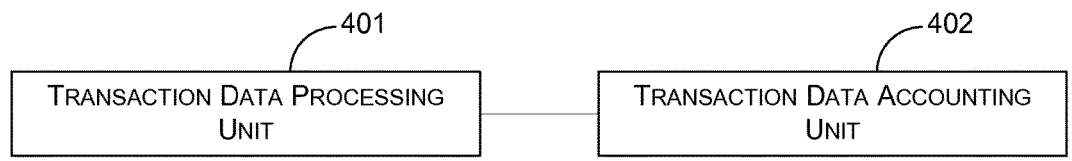
FIG. 4 shows a logical structure graph of a server according to an embodiment of the present disclosure.

The present disclosure provides embodiments of an application server installed in a transaction data accounting system. This type of application server is suitable for an e-commerce system comprises the aforementioned e-commerce transaction system 101, data warehouse system 102 and transaction data accounting system 104. The e-commerce transaction system 101 comprises the first server and the first database. The transaction data accounting system 104, used to perform data accounting of the transaction data obtained from the e-commerce transaction system 101, comprises the second server and the second database. As shown in FIG. 4, the second server comprises: a transaction data processing unit 401 and a transaction data accounting unit 402. The transaction data processing unit 401 obtains, in real-time, the transaction data sent by the first server, and provides the obtained transaction data to the transaction data accounting unit 402. The transaction data accounting unit 402 analyzes the transaction data to determine the classification of the transaction data. Based on the classification, the transaction data accounting unit 402 obtains historical data of this classification from the second database, and combines the obtained transaction data and the historical transaction data to produce current transaction data of the classification. The second database inquires the data warehouse system 102 for transaction data that meet a preset condition and compares it with previously obtained transaction data to update inconsistency in the transaction data.

The transaction data processing unit 401 sends transaction data to the transaction data accounting unit 402, each time the transaction data processing unit 401 obtains the transaction data, to trigger the transaction data accounting unit 402 to commence accounting of the transaction data. In one embodiment, the transaction data processing unit 401 can send the transaction data accounting unit 402 a trigger message containing the transaction data.

Upon receiving the transaction data, the transaction data accounting unit 402 analyzes the transaction data and determines the classification of the transaction data. Specifically, the transaction data sent by the first server may contain not only the content but also its classification information. This way, the transaction data accounting unit 402 can directly acquire the classification information from the transaction data. The transaction data accounting unit 402 may also pre-record a correlation table of correlations between keywords and classifications. A classification can correlate to one or more keywords. The transaction data accounting unit 402 may extract the keyword from the obtained transaction data and use the keyword in the correlation table to find the corresponding classification. This is also a way of acquiring the classification information of the transaction data. There may be other ways for the transaction data accounting unit 402 to analyze data and acquire its classification information, but in the interest of brevity no further examples will be provided herein.

After the transaction data accounting unit 402 acquires the classification information of the data, it can send a request message to the second database. The message contains the classification information of the transaction data, and requests the second database for historical transaction data under this classification. After the second database receives the request, it can use the classification information that the message carries as a keyword to locally search for historical transaction data under this classification and send the search result back to the transaction data accounting unit 402. Under special circumstances, for example when there is no historical data of a given classification stored in the second database, the second database can send a response message back to the transaction data accounting unit 402 indicating no historical transaction data under the given classification could be found.

In one embodiment, the transaction data accounting unit 402 can follow one or more rules to perform data accounting of the transaction data in real-time basis. Prior to this, it may receive client-specified accounting rules from a client terminal. For example, before the transaction data processing unit 402 processes transaction data, the system administrator of e-commerce transaction data accounting system 104 may set rules or guidelines and provide to the transaction data accounting unit 402 so that the transaction data accounting unit 402 may operate under the client-specified rules or guidelines.

In one embodiment, a rule may be, for example, that transaction data of the same classification are to be added together. In this case, the transaction data accounting unit 402 will add the acquired transaction data to historical transaction data of the same classification.

If the transaction data meeting certain preset condition and obtained by the second database from the data warehouse system 102 and previously obtained transaction data that meet the preset condition are inconsistent, then the transaction data accounting 402 may use the data from the data warehouse system 102. In other words, data provided by the second database to the transaction data accounting unit 402 should be the complete and accurate data maintained by the data warehouse system 102. This way, data accounting carried out by the transaction data accounting unit 402 is based on complete and accurate data.

In one embodiment, after the transaction data processing unit 401 acquires the transaction data, it may record a transaction data log in a transaction data log table that is stored in the second database.

In one embodiment, the transaction data processing unit 401 may store the obtained transaction data in the second database. Likewise, the transaction data accounting unit 402 may also store obtained transaction data in the second database. In another embodiment, either the transaction data processing unit 401 or the transaction data accounting unit 402 stores its obtained transaction data in the second database.

The system administrator of the e-commerce system may need to search data and may send the transaction data accounting unit 402 a request message for data meeting certain preset condition. Upon receiving the request message, the transaction data accounting unit 402 requests the second database for transaction data meeting the conduction. The second database, after searching and finding transaction data meeting the condition, sends the search result back to the transaction data accounting unit 402. Transaction data accounting unit 402, in turn, sends the search result to the system administrator.

The functional and relationship description of the server embodiment shown in FIG. 4 corresponds to the method embodiment shown in FIG. 3. Thus, the relationship between the units shown in FIG. 4 as well as their functions will not be repeated in the interest of brevity, and one may refer to the description for FIG. 3.

Many operations of the process shown in FIG. 3 are mainly implemented by the second server of the e-commerce transaction data accounting system 104. In another embodiment, the server shown in FIG. 4 is implemented in an e-commerce transaction data accounting system 104. Therefore, the embodiments of the present disclosure also provide an exemplary e-commerce transaction data accounting system. This transaction data accounting system is applicable to an e-commerce system that comprises the e-commerce transaction system 101, data warehouse system 102, and e-commerce transaction data accounting system 104. The e-commerce transaction system 101 comprises the first server and first database. The e-commerce transaction data accounting system 104 processes transaction data from the e-commerce transaction system 101.

Figure 5:
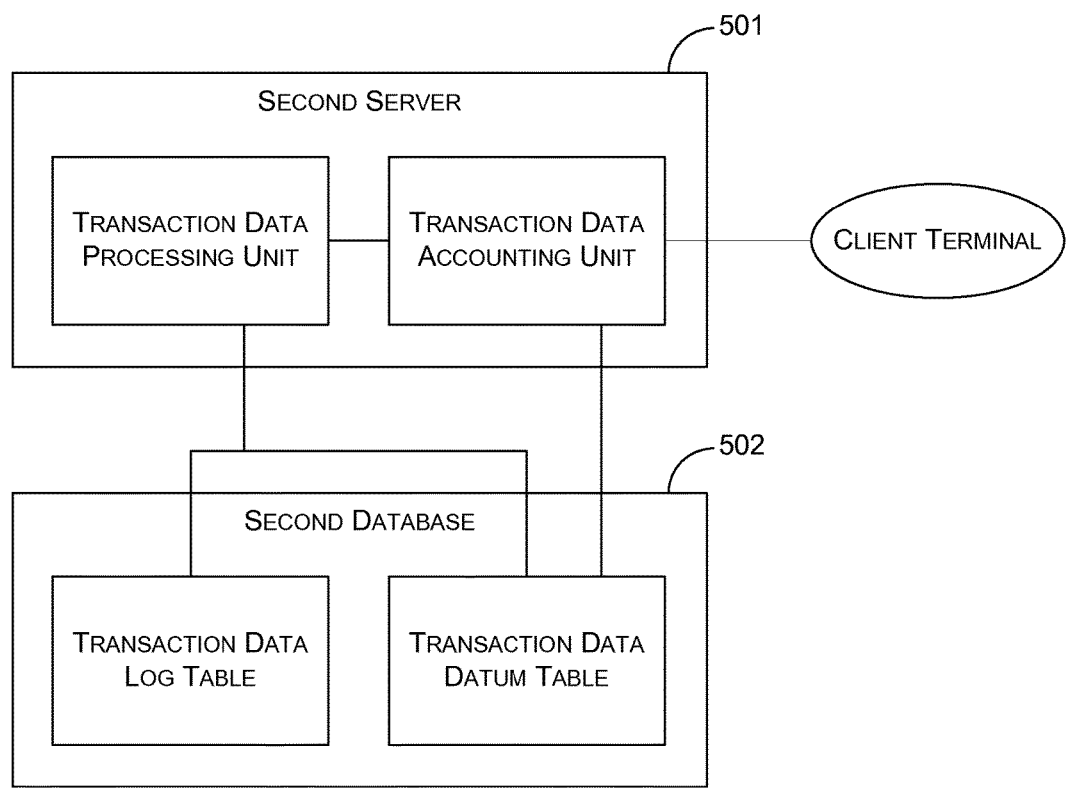
FIG. 5 shows a logical structure graph of the e-commerce transaction data accounting system according to an embodiment of the present disclosure.

As shown in FIG. 5, the e-commerce transaction data accounting system 104 comprises the second server 501 and the second database 502. The second server 501 is used to receive transaction data from the first server in real-time. The transaction data is analyzed by the second server to obtain the classification information. Based on the classification information, the second server obtains from the second database historical transaction data under the classification and adds this historical transaction data with the obtained transaction data to produce current transaction data under the given classification. The second database 502 is used to store the transaction data and to search the data warehouse system 102, not on a real-time basis, to acquire data meeting certain preset condition. A comparison between the data from the data warehouse system 102 that meets the preset condition and the obtained transaction data is made, and inconsistency in the obtained transaction data is updated.

Optionally, the second database 502 may have established therein a transaction data log table that stores a transaction data log and a transaction data standards table that stores transaction data. In the transaction data log table, a record can record user events with each user event as a unit. In the transaction data standards table, a record can record data related to users with each user as a unit. The second server 501 can record the data log of the obtained transaction in the transaction data log table.

The specific functions of and relationship between the second server 501 and the second database 502 are described in detail with respect to the process of FIG. 3 as well as the server of FIG. 4. In the interest of time, detailed description will not be repeated.

Figure 6:
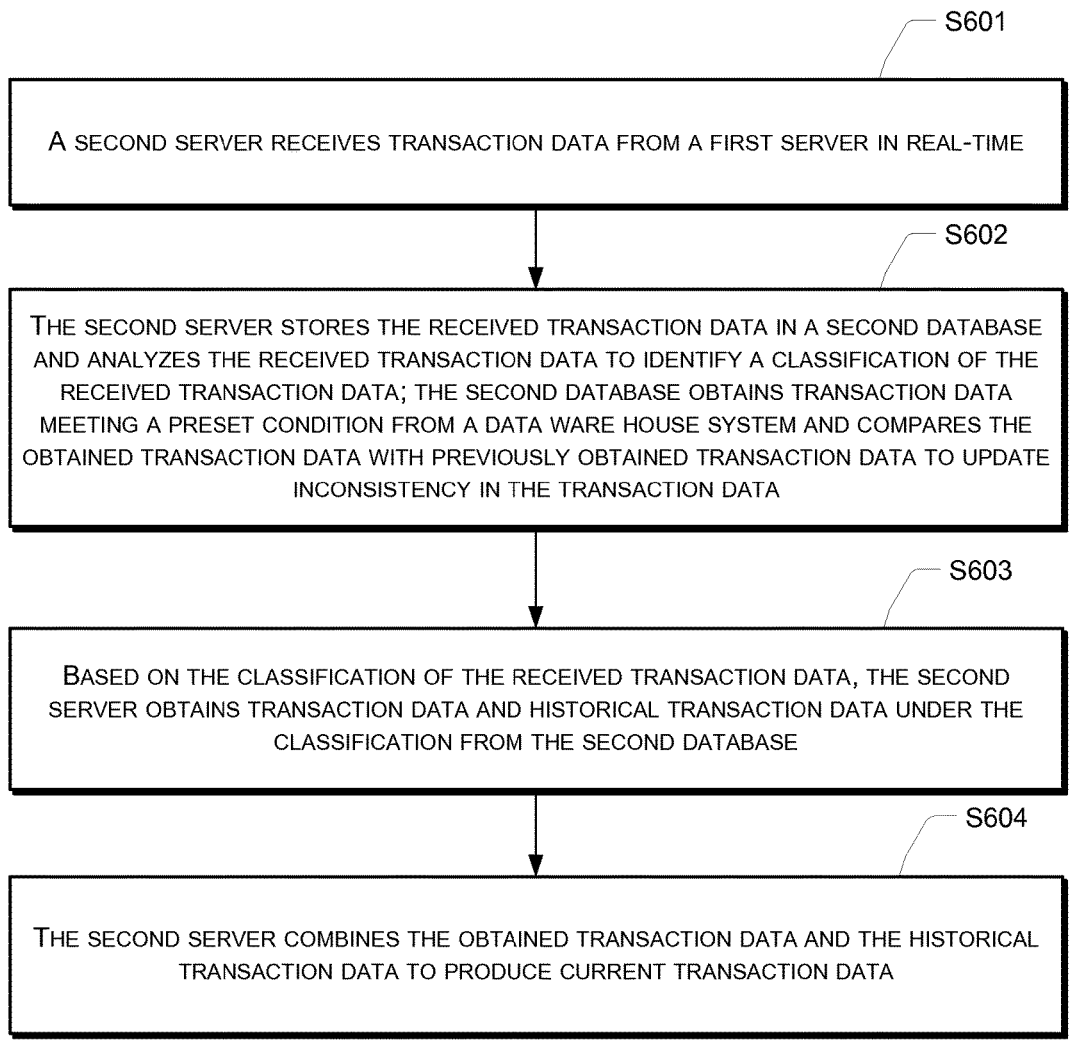
FIG. 6 shows a flowchart of a method for accounting e-commerce transaction data according to an embodiment of the present disclosure.

Aside from FIG. 3, the present disclosure also provides a method for accounting e-commerce transaction data. This method is applicable to an e-commerce system that comprises the e-commerce transaction system 101, data warehouse system 102 and e-commerce transaction data accounting system 104. The e-commerce transaction system 101 comprises the first server and the first database. The e-commerce transaction data accounting system 104 is used to perform data accounting of the transaction data gathered from the e-commerce transaction system 101. The transaction data accounting system 104 comprises the second server and the second database. With reference to FIG. 6, operations of the process are described below.

At S601, the second server receives, in real-time, transaction data sent by the first server.

In one embodiment, the first server may provide transaction data in real-time to the e-commerce transaction data accounting system 104 independent of the e-commerce transaction system 101 and the data warehouse system 102. In one embodiment, the first server can send the transaction data to the second server in real-time.

The first server can send to the second server an asynchronous message carrying transaction data. An asynchronous message can carry data generated from a one-time process done by one user. The asynchronous message may be reliable or unreliable. If a reliable asynchronous message is sent by the first server, then the message can reach the second server without any loss in data. If however an unreliable asynchronous message is sent by the first server, then there may be some form of data loss or the second server may not receive the message at all. In this case, the second server may be unable to obtain some transaction data.

For practical applications, the cost associated with sending a reliable asynchronous message is generally higher than the cost associated with sending an unreliable asynchronous message.

The action of sending the asynchronous message by the first server may be negligible and does not affect the normal operation of the e-commerce transaction system.

At S602, upon obtaining the transaction data, the second server stores the transaction data in the second database and analyzes the transaction data to obtain classification information. The second database may search the data warehouse system 102, not on a real-time basis, to acquire data meeting certain preset condition. A comparison between the data from the data warehouse system 102 that meets the given condition and previously obtained transaction data is made, and inconsistency in the obtained transaction data is updated.

In various embodiments, transaction data may be classified differently. For example, transaction data may be classified according to users or types of transaction operations.

Upon obtaining the transaction data, the second server will store the transaction data in the second database and analyze it to obtain the classification information related to the transaction data. In one embodiment, the storing and analyzing of the transaction data may be performed simultaneously or one after another in any order.

In one embodiment, the transaction data sent by the first server not only contains the content of the transaction data but also classification information of the transaction data. Under this circumstance, the second server can obtain the classification information directly from the transaction data. The second server can also store in advance a correlation table having correlations between keywords and classifications. Each classification may correlate to one or more keywords. Upon receiving the transaction data, the second server can extract the keyword from the transaction data, and use the keyword to search the correlation table for the corresponding classification. Of course, the second server can also use other methods to analyze the transaction data to obtain the classification, which will not be illustrated here.

As was mentioned earlier, if the first server sends an unreliable asynchronous message, then the second server may not receive the message and the transaction data. In this regard, the second server may search, not in a real-time basis, the data warehouse system 102 for data meeting certain preset condition and compare with the transaction data previously obtained. If there is inconsistency in the obtained transaction data, it is updated.

In one embodiment, the second database can periodically search the data warehouse system 102 and obtain data meeting certain preset condition. A user can set the periodicity of the search based on needs, such as every 10 minutes for example. The condition can also be set by the user and may be, for example, all data that have changed during the most recent period. The change in data may be addition in the data.

The second database can compare the obtained transaction data meeting the condition with the previously-stored transaction data meeting the condition. The second database takes no action when the compared data are consistent, otherwise it updates any inconsistency in the transaction data.

At S603, based on the classification of the obtained transaction data, the second server obtains from the second database the transaction data and historical data under the same classification.

Upon obtaining the transaction data's classification information, the second server sends a request message to the second database containing the classification information to request for all transaction data under the same classification, including the obtained transaction data and historical data. In response to receiving the request message, the second database can use the classification as the keyword to locally search for all the transaction data under the same classification and send the search result back to the second server. Under special circumstances, for one reason or another, if there is no historical data under the given classification stored in the second database, the second database may send back just the transaction data obtained by the second server that is under the given classification but no historical data.

At S604, the second server integrates the obtained transaction data and historical transaction data to provide the current transaction data.

A noteworthy point is that, even though the second server has stored the previously obtained transaction data in the second database, the second database may merely correlate the obtained transaction data and its corresponding classification and not add the obtained data with historical transaction data of the same classification. In this case, the data stored under a given classification in the second database comprises at least the obtained transaction data and the historical transaction data of the given classification. Accordingly, the second server can integrate the obtained transaction data with the corresponding historical transaction data to produce the current transaction data of that classification.

In one embodiment, the second server may follow the accounting rules for data accounting of the transaction data in real-time. Prior to this, the second server may receive from a client terminal user-specified accounting rules for transaction data. For example, an e-commerce administrator may, through a client terminal, set the accounting rules and provide the rules to the second server for the second server to implement.

In one embodiment, the aforementioned rules may require adding transaction data of the same classification. In this case, the second server would add the obtained transaction data with the historical transaction data of the same classification.

As mentioned before, it is possible for the second database to receive from the data warehouse system 102 transaction data meeting certain preset condition but such data may be inconsistent with previously stored transaction data that also meet the condition. If this is the case, the second server can still proceed with the accounting process by using the transaction data provided by the data warehouse system 102. In other words, the data provided by the second database to the second server are complete and accurate data stored by the data warehouse system 102. This way, the second server can perform data accounting based on complete and accurate data.

Optionally, after implementing the operation of S601, the second server can store a data log containing the obtained transaction data in a transaction data log table of the second database. The transaction data log table can record data with each user-initiated event as a unit for recording or with each asynchronous message as a unit for recording.

After storing transaction data in the second database, the second database can analyze the transaction data, obtain information of the classification of the transaction data, and correlate the transaction data with the classification. This way, the second database can search and locate all transaction data of this classification based on the correlation.

When the system administrator searches for certain transaction data, the client terminal, e.g., a computer, used by the system administrator can send to the second server a request message for transaction data meeting certain preset condition. After receiving the request message, the second server can request the second database to search for transaction data meeting the given condition. Upon locating transaction data meeting the given condition, the second database returns the search result, i.e., transaction data meeting the given condition, back to the second server, which in turn sends the search result to the client terminals used by the system administrator.

The process embodiment illustrated in FIG. 6 and the process embodiment illustrated in FIG. 3 share certain common technological characteristics. The detailed description of those technical characteristics, as can be referred to the description for FIG. 3, will not be repeated.

Corresponding to the process embodiment of FIG. 6, the present disclosure also provides an implementation of the application server in the e-commerce transaction data accounting system. Such application server is suitable for an e-commerce system that comprises the e-commerce transaction system 101, a data warehouse system 102 and an e-commerce transaction data accounting system 104. The e-commerce transaction system 101 may comprise the first server and the first database as described above. The e-commerce transaction data accounting system 104 may perform data accounting of the transaction data obtained from the e-commerce transaction system 101, and may comprise the second server and the second database as described above. As shown in FIG. 4, the second server may comprise: the transaction data processing unit 401 and the transaction data accounting unit 402 as described above. The transaction data processing unit 401 obtains the transaction data sent by the first server in real-time, stores the obtained transaction data in the second database, and analyzes the obtained transaction data to acquire classification information related to the obtained transaction data. The transaction data processing unit 401 sends the transaction data accounting unit 402 a trigger message containing the classification information to trigger accounting of the transaction data by the transaction data accounting unit 402. Based on the classification information, the transaction data accounting unit 402 obtains the aforementioned transaction data and historical transaction data of the same classification from the second database, combines the transaction data and the historical transaction data to produce the current transaction data. The second database searches and obtains from the data warehouse system 102 transaction data that meet certain preset condition, compares such transaction data with previous corresponding transaction data, and updates inconsistency in the transaction data.

One significant difference between this server embodiment and the earlier one is that, after obtaining the classification information related to the obtained transaction data, the transaction data processing unit 401 sends to the transaction data accounting unit 402 a trigger message that contains the classification information but not the transaction data. The transaction data accounting unit 402 obtains from the second database the transaction data obtained by the transaction data processing unit 401 and historical data of the same classification.

This server embodiment has many technical similarities with the one previously described. For example, after obtaining transaction data, the transaction data processing unit 401 records the log of transaction data in a transaction data log table in the second database. In the interest of brevity, a description of these features will not be repeated.

Furthermore, this server embodiment corresponds to the process embodiment illustrated in FIG. 6. A person of ordinary skill in the art may refer to the process in FIG. 6 for the description of the function and relationship of each functional unit of the server embodiment. Therefore, a description will not be repeated.

In the process embodiment in FIG. 6, there are many operations in which the server of the transaction data accounting system is considered the implementing agent. On the other hand, the corresponding server is also installed in the transaction data accounting system. Therefore, the present embodiment also provides an e-commerce system. This e-commerce system comprises the e-commerce transaction system 101, data warehouse system 102 and the transaction data accounting system 104. The e-commerce transaction system 101 comprises the first server and the first database. The transaction data accounting system 104 is used for accounting of the data obtained from the e-commerce transaction system. In FIG. 5, the transaction data accounting system 104 comprises: the second server 501 and the second database 502. The second server 501 obtains in real-time the transaction data sent by the first server. The second server 501 stores the transaction data in the second database 502, analyzes the data, and acquires the classification information indicative of the classification the transaction data belongs. Based on this classification information, the second server 501 obtains the transaction data and historical transaction data of the classification from the second database 502, and combines the transaction data and the historical transaction data to produce the current transaction data. The second database stores transaction data, searches the data warehouse system 102, not in real-time, to obtain transaction data meeting a certain preset condition, and compares the obtained transaction data with previous corresponding transaction data to update inconsistency in the transaction data.

Optionally, the second database 502 can set up a transaction data log table to store a transaction data log and a transaction data datum table to store transaction data. In the transaction data log table, a record can be a unit for each event initiated by a user. In the transaction data datum table, each user can be a unit of a record. The second server 501 can store a log of obtained transaction data in the transaction data log table.

The specific functions of and the relationship between the second server 501 and the second data 502 correspond to the process embodiment of FIG. 6. Therefore, in the interest of brevity, a detailed description will not be repeated.

As described above, the second server of the e-commerce transaction data accounting system 104 acquires in real-time from the first server of the e-commerce transaction system 101 and not from the database of the e-commerce transaction system 101. This will not burden the system database and will not affect the normal business of the database. This technique will also prevent the database from crashing.

Moreover, the first server of the e-commerce transaction system 101 can also provide the transaction data to the transaction data accounting system 104 through the unreliable asynchronous messages. This will not affect or slow down the normal data processing of the system.

Furthermore, the transaction data accounting system 104 can obtain, not in real-time, transaction data meeting a preset condition, especially those which were changed recently within the cycle period. This is true even if the transaction data accounting system does not receive all of the asynchronous messages. In other words, this technique can guarantee that all the transaction data can be obtained by the transaction data accounting system at the end of the cycle. This can provide the data accounting process with a more accurate data structure.

A person of ordinary skill in the art can appreciate that the present disclosure can be implemented by software with the necessary hardware. The present disclosure can be implemented as a software product. This software can be stored in storage media like ROM/RAM, floppy/hard drive, CD-ROM or the like. It comprises some instructions so that computer equipment (e.g., PC, server, network equipment) can implement the whole or a part of the method.

Each embodiment is described progressively, the similarities of each can be cross referenced with one another. The emphasis in the present disclosure is the differences of each embodiment to one another. Particularly, the system embodiment is described only briefly because of its fundamental similarities with the process embodiment.

The various embodiments can be used with many common or specialized computing system environments or configurations such as, for example: personal computers, server computers, hand-held devices or portable devices, flat-type devices, multiprocessor systems, microprocessor systems, set-top boxes, programmable consumer electronics, network PC, minicomputer, mainframe computers, and distributed computing environment.

The present disclosure can execute a command in the computer as described (e.g., program module). The program module comprises executing special tasks or implementing specialized abstract data category routines, programs, objects, components and other data structures. The present disclosure can also be executed on a distributed computing environment.

With various embodiments fully described in the present disclosure, variations or modifications thereof by a person of ordinary skill in the art do not depart from the spirit of the present disclosure, and thus are still within the scope of the present disclosure.

What is claimed is:

1. A method comprising:
receiving one or more asynchronous messages including transaction data from a first server of a transaction system that comprises the first server and a first database without affecting normal operations of the first database, the transaction data being stored in the first database with a history of changes in the transaction data being recorded in a data warehouse system that is different from the transaction system;
storing the received transaction data in a second database;
analyzing the received transaction data to identify a classification of the received transaction data;
sending a request for obtaining historical transaction data from the second database based at least in part on the classification of the received transaction data;
obtaining transaction data that meets a preset condition from the data warehouse system in response to failing to receive at least some of the historical transaction data from the second database, the at least some of the historical transaction data being lost from the second database in response to one or more previous asynchronous messages that include the at least some of the historical transaction data being unreliable, wherein the transaction data that meets the preset condition comprises transaction data that varied during a predetermined time interval; and
integrating the transaction data received from the first server and the historical transaction data received from the data warehouse system to produce current transaction data.

2. The method as recited in claim 1, wherein the classification of the received transaction data is based on users or types of transaction operations.

3. The method as recited in claim 1, further comprising storing a log of the received transaction data in a transaction data log table in the second database after receiving the transaction data from the first server.

4. The method as recited in claim 1, further comprising storing a log of the received transaction data in a transaction data log table, the transaction data log table recording data with user-initiated events as units for recording or with asynchronous messages sent from the first server as the units for recording.

5. A transaction data accounting system implemented by one or more computing devices, the transaction data accounting system comprising: a second server and a second database,
the second server to:
receive one or more asynchronous messages including transaction data from a first server of a transaction system that comprises the first server and a first database without affecting normal operations of the first database, the transaction data being stored in the first database with a history of changes in the transaction data being recorded in a data warehouse system, the data warehouse system, the transaction system and the transaction data accounting system are different from one another,
analyze the received transaction data to identify a classification of the received transaction data,
send a request for obtaining, from the second database, historical transaction data under the classification,
combine the received transaction data and the historical transaction data to produce current transaction data, and the second database to:
obtain transaction data that meets a preset condition from the data warehouse system in response to failing to receive at least some of the historical transaction data from the second database, the at least some of the historical transaction data being lost from the second database in response to one or more previous asynchronous messages that include the at least some of the historical transaction data being unreliable, the obtained transaction data that meets the preset condition comprises transaction data that has varied during a predetermined time interval.

6. The transaction data accounting system as recited in claim 5, wherein, after receiving the transaction data, the second server stores a log of the received transaction data in a transaction data log table in the second database.

7. The transaction data accounting system as recited in claim 5, wherein the second server stores a log of the received transaction data in a transaction data log table in the second database, the transaction data log table recording data with user-initiated events as units for recording or with the one or more asynchronous messages as the units for recording.

8. The transaction data accounting system as recited in claim 5, wherein the classification of the received transaction data is based on users or types of transaction operations.

9. A system implemented by one or more computing devices, the system performing acts comprising:
receiving transaction data from a first server of a transaction system that comprises a first server and a first database without affecting normal operations of the first database, the transaction data being stored in the first database with a history of changes in the transaction data being recorded in a data warehouse system that is different from the transaction system;
storing the received transaction data in a second database;
analyzing the received transaction data to identify a classification of the received transaction data;
sending a request for obtaining historical transaction data from the second database based at least in part on the classification of the received transaction data, wherein the historical data comprises
obtaining transaction data that meets a preset condition and is obtained from the data warehouse system in response to failing to receive at least some of the historical transaction data from the second database, the at least some of the historical transaction data being lost from the second database in response to one or more previous asynchronous messages that include the at least some of the historical transaction data being unreliable, wherein the transaction data that meets the preset condition comprises transaction data that varied during a predetermined time interval; and
integrating the transaction data received from the first server and the historical transaction data received from the data warehouse system to produce current transaction data.

10. The system as recited in claim 9, the acts further comprising receiving one or more asynchronous messages from the first server, the one or more asynchronous messages containing the received transaction data.

11. The system as recited in claim 9, wherein the classification of the received transaction data is based on users or types of transaction operations.

12. The system as recited in claim 9, the acts further comprising storing a log of the received transaction data in a transaction data log table in the second database after receiving the transaction data from the first server.

13. The system as recited in claim 9, the acts further comprising storing a log of the received transaction data in a transaction data log table, the transaction data log table recording data with user-initiated events as units for recording or with asynchronous messages sent from the first server as the units for recording.

\* \* \* \* \*